(12) United States Patent
Xu et al.

(10) Patent No.: US 11,162,891 B2
(45) Date of Patent: Nov. 2, 2021

(54) APPARATUS AND METHOD FOR MEASURING REFLECTIVITY OF SEABED SEDIMENTS

(71) Applicant: SOUTH CHINA SEA INSTITUTE OF OCEANOLOGY, CHINESE ACADEMY OF SCIENCES, Guangzhou (CN)

(72) Inventors: Zhantang Xu, Guangzhou (CN); Jun Zhao, Guangzhou (CN); Yuezhong Yang, Guangzhou (CN); Cai Li, Guangzhou (CN); Wen Zhou, Guangzhou (CN); Kai Zeng, Guangzhou (CN); Wenxi Cao, Guangzhou (CN)

(73) Assignee: SOUTH CHINA SEA INSTITUTE OF OCEANOLOGY, CHINESE ACADEMY OF SCIENCES, Guangzhuo (CN)

( * ) Notice: Subject to any disclaimer, the term of this patent is extended or adjusted under 35 U.S.C. 154(b) by 0 days.

(21) Appl. No.: 17/046,808

(22) PCT Filed: May 7, 2018

(86) PCT No.: PCT/CN2018/085818
§ 371 (c)(1),
(2) Date: Oct. 12, 2020

(87) PCT Pub. No.: WO2019/196154
PCT Pub. Date: Oct. 17, 2019

(65) Prior Publication Data
US 2021/0080383 A1  Mar. 18, 2021

(30) Foreign Application Priority Data
Apr. 12, 2018 (CN) .......................... 201810325604.1

(51) Int. Cl.
*G01N 21/25* (2006.01)
*G01N 21/27* (2006.01)

(52) U.S. Cl.
CPC ......... *G01N 21/255* (2013.01); *G01N 21/276* (2013.01); *G01N 2201/0218* (2013.01); *G01N 2201/0616* (2013.01)

(58) Field of Classification Search
CPC .................................................... G01N 21/276
See application file for complete search history.

(56) References Cited

U.S. PATENT DOCUMENTS 5,506,616 A * 4/1996 Scheps ............... G01N 21/8806
348/31
5,604,582 A * 2/1997 Rhoads ................. G01J 3/2823
250/458.1

(Continued)

FOREIGN PATENT DOCUMENTS

CN  105891131 A * 8/2016
CN  106770345 A * 5/2017
(Continued)

*Primary Examiner* — Shawn Decenzo
(74) *Attorney, Agent, or Firm* — Bayramoglu Law Offices LLC

(57) ABSTRACT

A device for measuring a reflectivity of an object at the seabottom, includes a spectral probe, a first white board, a second white board, a distance meter, and a shaft; the first white board and the second white board respectively have a known reflectivity; the first white board and the second white board are connected to the shaft, wherein the first white board and the second white board are spaced along an axial direction of the shaft and staggered from each other along a radial direction of the shaft; the spectral probe is configured to collect spectral data of the first white board, the second white board and the object at the seabottom; the distance meter is configured to collect distance data between the spectral probe and the object at the seabottom.

8 Claims, 3 Drawing Sheets

(56) References Cited

U.S. PATENT DOCUMENTS

| | | | | |
|---|---|---|---|---|
| 2011/0205536 A1* | 8/2011 | Johnsen | ............... | G01N 21/255 |
| | | | | 356/326 |
| 2018/0095189 A1* | 4/2018 | Craft | ...................... | G01V 1/186 |
| 2018/0356342 A1* | 12/2018 | Laycock | ............... | G01S 7/4802 |
| 2019/0011552 A1* | 1/2019 | Embry | .................. | G01S 17/89 |
| 2019/0346565 A1* | 11/2019 | Sloss | ....................... | G01S 7/533 |
| 2021/0190985 A1* | 6/2021 | Long | ................... | G01V 1/3808 |

FOREIGN PATENT DOCUMENTS

| | | | |
|---|---|---|---|
| CN | 106990116 A | * | 7/2017 |
| CN | 206517524 U | * | 9/2017 |
| CN | 207894820 U | * | 9/2018 |

* cited by examiner

APPARATUS AND METHOD FOR MEASURING REFLECTIVITY OF SEABED SEDIMENTS

CROSS-REFERENCE TO RELATED APPLICATIONS

This application is the national stage entry of International Application No. PCT/CN2018/085818, filed on May 7, 2018, which is based upon and claims priority to Chinese Patent Application No. 201810325604.1, filed on Apr. 12, 2018, the entire contents of which are incorporated herein by reference.

TECHNICAL FIELD

The present invention relates to the technical field of spectrum measurement, and particularly relates to a device and a method for measuring the reflectivity of an object at seabottom.

BACKGROUND

When sunlight is incident on seawater, part of the sunlight is directly reflected by the surface of seawater into the air, and another part of the sunlight enters the seawater. Since seawater is generally composed of pure seawater, phytoplankton, suspended silt, and colored dissolved organic matters, the sunlight entering the seawater is absorbed and scattered by the seawater. Part of the scattered light, carrying information of seawater composition, will penetrate the sea-air interface, pass through the atmosphere, and eventually be captured by satellites. Therefore, studying the optical signals captured by satellites is useful for interpreting the information of seawater composition and relevant information in the ocean.

However, for offshore area where seawater is shallow, sunlight penetrates the seawater and reaches sea bottom where it is reflected by silts, seagrass and corals back into the seawater, such that optical information of this reflected light will be mixed in the optical signals of seawater and captured by the satellites, affecting the interpretation of seawater composition; therefore, it is necessary to measure the reflectivity of objects at seabottom, which will be removed for identifying the extraneous signals. One the other hand, when studying marine organisms, such as seagrass and corals living on the seabottom, which exhibit special spectral characteristics during their growth process, studying the spectral characteristics is useful for identifying sediment composition and determining the growth cycles and health conditions of seagrass and corals.

At present, underwater spectrometers are commonly used to measure the reflectivity of objects at seabottom. FIG. 3 shows an underwater spectrometer, comprising a white board 200, a first spectral probe 110, and a second spectral probe 210; the reflectivity of the white board 200 is given, the first spectral probe 110 is configured to collect spectral data of the tested substance 100, and the second spectral probe 210 is configured to collect spectral data of the white board 200, wherein the distance between the tested substance 100 and the first spectral probe 110 is identical to the distance between the white board 200 and the second spectral probe 210. A method for calculating the reflectivity of the tested substance 100, based on the spectral data collected by the first spectral probe 110 and the second spectral probe 210, is as follows:

Let DN1 represent the spectral data corresponding to the light reflected by the tested substance 100 and collected by the first spectral probe 110, and DN2 represent the spectral data corresponding to the light reflected by the white board 200 and collected by the second spectral probe 210, generally in a wavelength range of 400 to 700 nm, they are given by:

$$\begin{cases} F \times RU = DN1 \\ F \times RG = DN2 \end{cases} \quad (A)$$

wherein, F represents the intensity of incident sunlight; since the white board 200 and the tested substance 100 are arranged with the same depth, angle and environment, the incident light intensities corresponding to the tested substance 100 and the white board 200 are identical and denoted as F; RU represents the reflectivity of the tested substance 100, which is unknown; RG represents the reflectivity of the white board 200, which is given.

The relationship between RU and RG can be derived from equation group (A), and expressed as equation (B):

$$\frac{RU}{RG} = \frac{DN1}{DN2} \quad (B)$$

It can be deduced from equation (B) to give the reflectivity of the tested substance, $RU = (DN1 \times RG)/DN2$, which can be used for sequential water analysis.

Though it is possible to measure the reflectivity of an object at seabottom using the above-mentioned underwater spectrometer, there are issues with its two-probe configuration. On one hand, spectral probes are expensive, resulting in high cost of the whole device; also, malfunction rate is largely increased. On the other hand, there will be differences between the spectral data collected by the two spectral probes; even though the differences can be corrected by calibration, during a long-term field work, each individual device will experience different attenuation and different influence of temperature, such that accuracies of the measurements of DN1 and DN2 will change separately, resulting in errors in the calculation of RU and affecting accuracy of the reflectivity measurement.

Moreover, the spectral probes and the white board (as a standard reference) of the underwater spectrometer may need to be immersed in seawater for several days or even one year for conducting a long-term measurement, making them prone to contamination by organisms, organic matters (such as oil) and inorganic matters (such as silt) in the water. Optical radiation measurement is very sensitive to this kind of contamination, and the measurement error caused by contamination will be different between windows. In view of the above, the two-probe measurement has limitation in terms of cost and accuracy.

SUMMARY

One object of the present invention is to overcome the deficiency of prior art by providing a device and a method for measuring the reflectivity of an object at seabottom, which allow the reflectivity measurement of objects at seabottom using only one spectral probe.

In order to realize the above object, the technical solution adopted by the present invention comprises:

A device for measuring a reflectivity of an object at seabottom, comprises a spectral probe, a first white board, a second white board, a distance meter, and a shaft;

the first white board and the second white board respectively have a known reflectivity; the first white board and the second white board are connected to the shaft in such a manner that they are spaced along an axial direction of the shaft and staggered from each other along a radial direction of the shaft;

the spectral probe is configured to collect spectral data of the first white board, the second white board and the object at seabottom;

the distance meter is configured to collect distance data between the spectral probe and the object at seabottom;

the shaft is configured to drive the first white board and the second white board to turn, so as to allow the first white board and the second white board be located in front of the spectral probe in sequence.

As a modification of the present invention, the device further comprises a moveable brush connected to the shaft, wherein the movable brush, the first white board, and the second white board are staggered from each other along the radial direction of the shaft, and the movable brush is configured to repeatedly wipe the spectral probe when driven by the shaft. By wiping the spectral probe using the movable brush, it is possible to protect the probe from contamination by organisms, organic matters and inorganic matters in the water when it is immersed in seawater for a long period.

As another modification of the present invention, the device further comprises a first fixed brush and a second fixed brush arranged alongside the shaft, allowing a reflecting surface of the first white board to be repeatedly wiped by the first fixed brush when the first white board is driven by the shaft, and a reflecting surface of the second white board to be repeatedly wiped by the second fixed brush when the second white board is driven by the shaft. By wiping the reflecting surfaces of the white boards using the fixed brushes, it is possible to protect the surfaces from contamination by organisms, organic matters and inorganic matters in the water when they are immersed in seawater for a long period.

As another modification of the present invention, the first white board and the second white board are rotatably connected to the shaft through spherical plain bearings. This configuration allows freedom of angular movements of the first white board and the second white board in all directions, so that the sunlight incident angles on the first white board, the second white board and the object at seabottom are identical.

As another modification of the present invention, the device further comprises a base, an L-shaped support, and a motor, wherein the spectral probe and the distance meter are disposed at an upper surface of the base, the motor is disposed at a lower surface of the base; an upper end of the L-shaped support is rotatably connected to an upper end of the shaft, and a lower end of the L-shaped support is fixed to the base; a lower end of the shaft penetrates the base and is connected to an output shaft of the motor; the first fixed brush and the second fixed brush are spacedly fixed to the L-shaped support.

A method for measuring the reflectivity of the object at seabottom, based on the above device, comprises the following steps:

step 1: rotating the shaft to enable the first white board to face the spectral probe, and collecting spectral data $N_1$ of the first white board through the spectral probe;

step 2: rotating the shaft to enable the second white board to face the spectral probe, and collecting spectral data $N_2$ of the second white board through the spectral probe;

step 3: rotating the shaft to enable the first white board and the second white board to diverge from the spectral probe, collecting spectral data $N_3$ of the object at seabottom through the spectral probe, and collecting distance data between the spectral probe and the object at seabottom through the distance meter;

step 4: calculating the reflectivity $R_3$ of the object at seabottom through the following equation group:

$$\begin{cases} R_3 = \dfrac{N_3 R_1}{N_1} \cdot e^{2k(L_2+L_3)} \\ k = \dfrac{\ln\dfrac{N_1 R_2}{N_2 R_1}}{2L_2} \end{cases} \quad (1)$$

wherein, $R_1$ represents the reflectivity of the first white board, $R_2$ represents the reflectivity of the second white board, $L_2$ represents a distance between the first white board and the second white board, $L_3$ represents a distance between the second white board and the object at seabottom, and k represents an attenuation coefficient of light in seawater.

Compared with the prior art, the present invention has the following advantages:

With the device of the present invention for measuring the reflectivity of an object at seabottom, it is possible to estimate the attenuation coefficient of light in seawater, through the use of the first white board and the second white board which respectively have a known reflectivity and a different distance from the spectral probe, and calculate the reflectivity of the object at seabottom by combining the attenuation coefficient with the distance from the object at seabottom. The whole device enables the measurement of reflectivity of objects at seabottom by using only one spectral probe, which reduces the cost for manufacture and operation.

Figure 1:
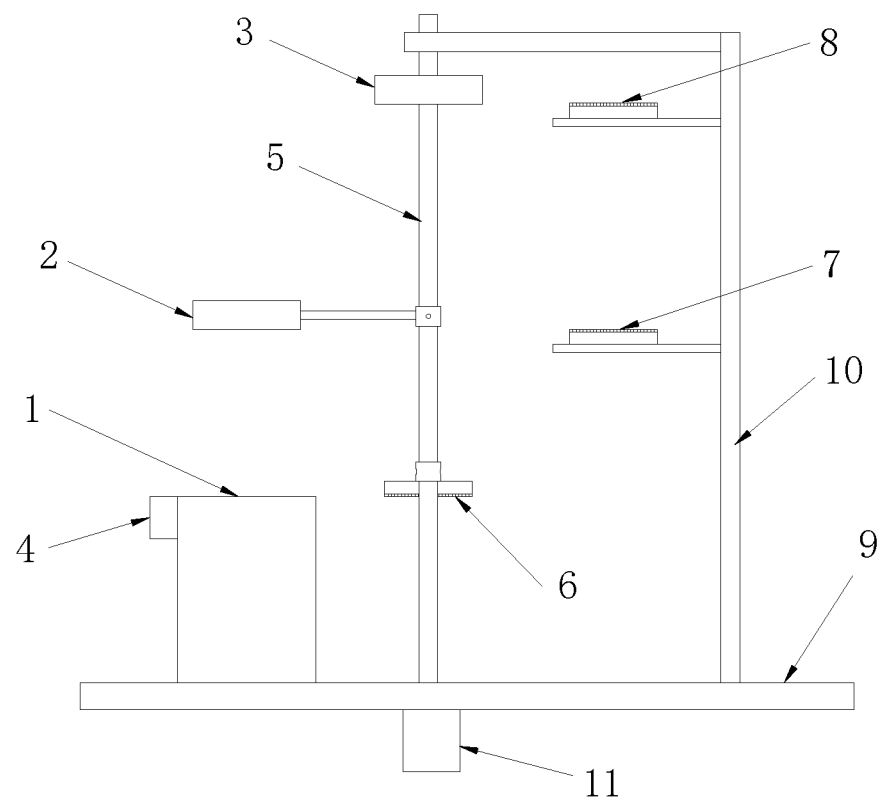
FIG. 1 is a front view of a device of the present invention.

Reference signs: 1—spectral probe; 2—first white board; 3—second white board; 4—distance meter; 5—shaft; 6—movable brush; 7—first fixed brush; 8—second fixed brush; 9—base; 10—support; 11—motor; 12—object at seabottom.

DETAILED DESCRIPTION OF THE EMBODIMENTS

In order to make the objectives, technical solutions and effects of the present invention clearer, the present invention will be further described in detail below with reference to the drawings and examples. The drawings are only for illustrative purposes but shall not be construed as limitation to the patent. In order to better illustrate the embodiment, some parts may be omitted, enlarged or reduced in the drawings, which do not represent the size of the actual product. For those skilled in the art, it shall be understandable that some commonly-known structures in the drawings and their descriptions may be omitted.

Figure 2:
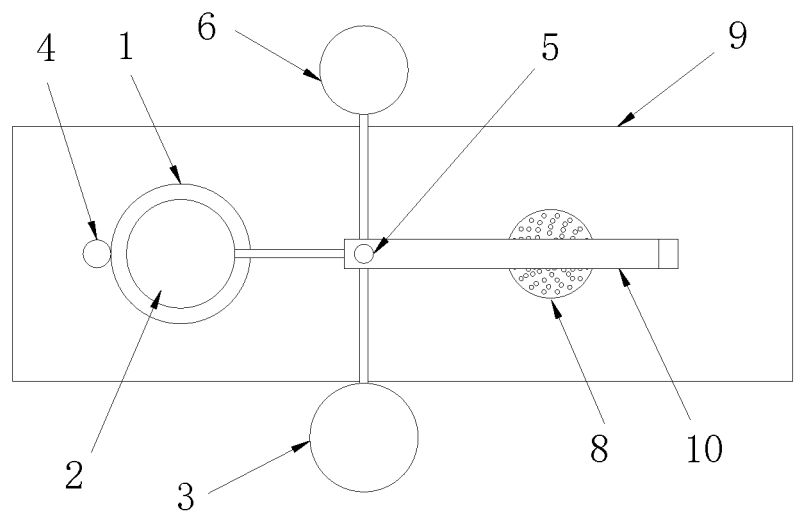
FIG. 2 is a top view of the device of the present invention.
Figure 3:
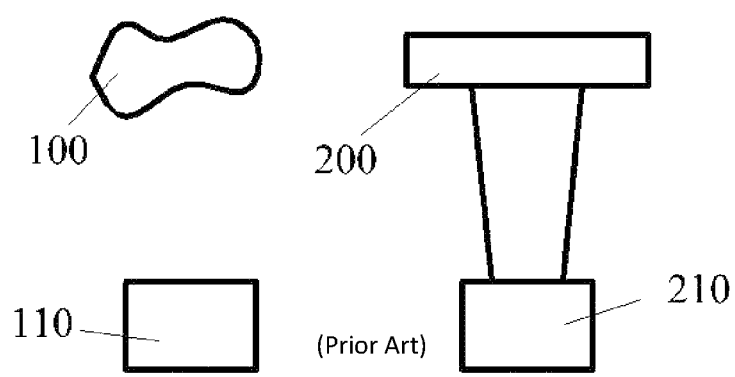
FIG. 3 is a schematic diagram of an existing underwater spectrometer.

As shown in FIG. 1 and FIG. 2 is a device for measuring a reflectivity of an object at seabottom, comprising a spectral probe 1, a first white board 2, a second white board 3, a distance meter 4, a shaft 5, a movable brush 6, a first fixed brush 7, a second fixed brush 8, a base 9, an L-shaped support 10, and a motor 11. Other elements of the devices, such as spectrum analyzer, processor, display, power supply, sealing parts, depth probe and camera, can be arranged depending on actual needs; they are all conventional technologies and thus will not be discussed in detailed herein.

The base 9 serves as a platform for bearing the device. The spectral probe 1 and the distance meter 4 are disposed at an upper surface of the base 9, wherein the distance meter 4 can be fixed on either the spectral probe 1 or the base 9. The motor 11 is disposed at a lower surface of the base 9. An upper end of the L-shaped support 10 is rotatably connected to an upper end of the shaft 5 via a bearing, and a lower end of the L-shaped support is fixed to the upper surface of the base 9. A lower end of the shaft 5 penetrates the center of the base 9 and is connected to an output shaft of the motor 11. Another bearing is also provided between the shaft 5 and the base 9. An angle, between a plane determined by the L-shaped support 10 and the shaft 5 and another plane determined by the spectral probe 1 and the shaft 5, can be 90° to 180°. The first fixed brush 7 and the second fixed brush 8 are spacedly fixed to the L-shaped support 10. A brushing surface of the first fixed brush 7 faces upwards, and matches the altitude of the reflecting surface of the first white board 2; a brushing surface of the second fixed brush 8 also faces upwards, and matches the altitude of the reflecting surface of the second white board 3.

The first white board 2 and the second white board 3 respectively have a known reflectivity. The first white board 2, the second white board 3, and the movable brush 6 are respectively fixed to the shaft 5 via a connecting rod; specifically, they may be fixed by sleeving or screws, or any other existing means, provided that they are movable along the shaft 5 and rotatable along the circumferential direction of the shaft 5. In order to have the same sunlight incident angle on the first white board 2, the second white board 3 and the object 12 at seabottom, the first white board 2 and the second white board 3 are all connected to the connecting rods through spherical plain bearings; of course, an existing automatic control device may also be introduced for automatically adjusting the deflection angles of the first white board 2 and the second white board 3 according to an inclination of the object 12 at seabottom. The movable brush 6, the first white board 2 and the second white board 3 are spacedly disposed from upper to lower. A brushing surface of the movable brush 6 faces downwards, and its altitude matches the spectral probe 1. The distance between the first white board 2 and the second white board 3 is adjustable according to design need. The first white board 2, the second white board 3 and the movable brush 6 are staggered from each other along the radial plane of the shaft 5. In the present embodiment, the first white board 2 forms an angel of 90° with both the second white board 3 and the movable brush 6 respectively; but of course, it is also applicable when the angles between each two of the first white board 2, the second white board 3 and the movable brush 6 are all 120°.

Units for fixing the first white board 2, the second white board 3, the movable brush 6, the first fixed brush 7 and the second fixed brush 8 are all made of copper, since copper ions are toxic and prevent organisms from attaching and growing on the units.

The spectral probe 1 is configured to collect the spectral data of the first white board 2, the second white board 3 and the object 12 at seabottom. The distance meter 4 is configured to collect the distance data between the spectral probe 1 and the object 12 at seabottom. In the present invention, a transmitter of the distance meter 4 is aligned with the spectral probe 1, so as to enable the measurement of the distance between the spectral probe 1 and the object 12 at seabottom; and since the distances between the spectral probe 1 and the first white board 2 and the second white board 3 are known, the distance between the second white board 3 and the object 12 at seabottom can be calculated by subtracting the known distance between the second white board 3 and the spectral probe 1. The shaft 5 rotates when driven by the motor 11, and thereby drives the first white board 2 and the second white board 3 to turn, so as to allow the first white board 2 and the second white board 3 be located in front of the spectral probe 1 in sequence; also, it drives the movable brush 6 to repeatedly wipe the spectral probe 1, and allows the reflecting surface of the first white board 2 to be repeatedly wiped by the first fixed brush 7 and the reflecting surface of the second white board 3 to be repeatedly wiped by the second fixed brush 8. By wiping the spectral probe 1, the first white board 2 and the second white board 3 with the movable brush and fixed brushes, it is possible to protect them from contamination by organisms, organic matters and inorganic matters in the water when they are immersed in seawater for a long period.

When the device of the present invention for measuring the reflectivity of an object at seabottom is in operation, since one single measurement takes a relatively short time, the incident angle and irradiance of sunlight remain unchanged during the entire measurement process, and therefore the irradiances to the first white board 2, the second white board 3 and the object 12 at seabottom correlate with the attenuation coefficient of light in seawater. The measurement method is as follows:

step 1: rotating the shaft 5 to enable the first white board 2 to face the spectral probe 1, and collecting spectral data $N_1$ of the first white board 2 through the spectral probe;

step 2: rotating the shaft 5 to enable the second white board 3 to face the spectral probe 1, and collecting spectral data $N_2$ of the second white board 3 through the spectral probe 1;

step 3: rotating the shaft 5 to enable the first white board 2 and the second white board 3 to diverge from the spectral probe 1, collecting spectral data $N_3$ of the object 12 at seabottom through the spectral probe 1, and collecting distance data between the spectral probe 1 and the object 12 at seabottom through the distance meter 4;

step 4: calculating the reflectivity $R_3$ of the object 12 at seabottom through the following equation group:

$$\begin{cases} R_3 = \dfrac{N_3 R_1}{N_1} \cdot e^{2k(L_2 + L_3)} \\ k = \dfrac{\ln \dfrac{N_1 R_2}{N_2 R_1}}{2L_2} \end{cases} \quad (2)$$

wherein, $R_1$ represents the reflectivity of the first white board 2, $R_2$ represents the reflectivity of the second white board 3, $L_2$ represents a distance between the first white board 2 and the second white board 3, $L_3$ represents a distance between the second white board 3 and the object 12 at seabottom, and k represents an attenuation coefficient of light in seawater.

Specifically, the derivation process of the above equations is as follows:

The incident irradiance of sunlight to the optical probe of the spectral probe 1 is defined as E. When light passes though seawater, part of the light is absorbed, and another part is scattered and deviates from the original direction. The combination of absorption and scattering constitutes light attenuation. The distance between the optical probe of the spectral probe 1 and the first white board 2 is defined as $L_1$, then the incident irradiance $E_1$ of sunlight to the first white board 2, the incident irradiance $E_2$ of sunlight to the second white board 3, and the incident irradiance $E_3$ of sunlight to the object 12 at seabottom can be expressed as follows:

$$\begin{cases} E_1 = E \cdot e^{-kL_1} \\ E_2 = E \cdot e^{-k \cdot (L_1+L_2)} \\ E_3 = E \cdot e^{-k \cdot (L_1+L_2+L_3)} \end{cases} \quad (3)$$

Take the first white board 2 as an example, the incident irradiance E of sunlight is attenuated to $E_1$ after passing through a path $L_1$, and further attenuated to $E_1'$ after passing through the path $L_1$ again, which is captured by the optical probe of the spectral probe 1. After the radiation is reflected by a white board having a reflectivity of R, luminance at the white board is $N_1'$, wherein $E_1'=N_1' \times \pi/R$, and attenuated luminance captured by the spectral probe after passing through the path $L_1$ is $N_1$. Accordingly, the spectral data $N_1$ of the first white board 2, the spectral data $N_2$ of the second white board 3, and the spectral data $N_3$ of the object 12 at seabottom, can be expressed as follows:

$$\begin{cases} N_1 = \dfrac{(E \cdot e^{-kL_1}) \cdot e^{-kL_1} \cdot R_1}{\pi} \\ N_2 = \dfrac{(E \cdot e^{-k(L_1+L_2)}) \cdot e^{-k(L_1+L_2)} \cdot R_2}{\pi} \\ N_3 = \dfrac{(E \cdot e^{-k(L_1+L_2+L_3)}) \cdot e^{-k(L_1+L_2+L_3)} \cdot R_3}{\pi} \end{cases} \quad (4)$$

Based on the equation group (4), the equations for calculating the reflectivity $R_3$ of the object 12 at seabottom can be obtained after eliminating E and $L_1$.

The device of the present invention, for measuring the reflectivity of an object at seabottom, realizes the measurement of reflectivity by using only one spectral probe, reducing the cost manufacture and operation, lowering the malfunction rate, and solving the problem of measurement deviation caused by the discrepancy between spectral probes.

The above-mentioned embodiments are only to illustrate the technical concept and characteristics of the present invention, so as to enable those of ordinary skill in the art to understand and implement the invention, but are not intended to limit the scope of the present invention. All equivalent changes or modifications made according to the essence of the present invention should fall within the scope of the present invention.

What is claimed is:

1. A device for measuring a reflectivity of an object at seabottom, comprising a spectral probe, a first white board, a second white board, a distance meter, and a shaft; wherein the first white board and the second white board respectively have a known reflectivity; the first white board and the second white board are connected to the shaft, wherein the first white board and the second white board are spaced along an axial direction of the shaft and the first white board and the second white board are staggered from each other along a radial direction of the shaft;

the spectral probe is configured to collect spectral data of the first white board, the second white board and the object at the seabottom;

the distance meter is configured to collect distance data between the spectral probe and the object at the seabottom;

the shaft is configured to drive the first white board and the second white board to turn, allowing the first white board and the second white board to be located in front of the spectral probe in sequence.

2. The device according to claim 1, wherein the device further comprises a moveable brush connected to the shaft, wherein the movable brush, the first white board, and the second white board are staggered from each other along the radial direction of the shift, and the movable brush is configured to repeatedly wipe the spectral probe when driven by the shaft.

3. The device according to claim 2, wherein the device further comprises a first fixed brush and a second fixed brush disposed alongside the shaft, allowing a reflecting surface of the first white board to be repeatedly wiped by the first fixed brush when the first white board is driven by the shaft, and a reflecting surface of the second white board to be repeatedly wiped by the second fixed brush when the second white board is driven by the shaft.

4. The device according to claim 1, wherein the first white board and the second white board are rotatably connected to the shaft through spherical plain bearings.

5. The device according to claim 3, wherein the device further comprises a base, an L-shaped support, and a motor, wherein the spectral probe and the distance meter are disposed at an upper surface of the base, and the motor is disposed at a lower surface of the base; an upper end of the L-shaped support is rotatably connected to an upper end of the shaft, and a lower end of the L-shaped support is fixed to the base; a lower end of the shaft penetrates the base and is connected to an output shaft of the motor; the first fixed brush and the second fixed brush are spacedly fixed to the L-shaped support.

6. A method for measuring the reflectivity of the object at the seabottom based on the device of claim 1, comprising the following steps:

step 1: rotating the shaft to enable the first white board to face the spectral probe, and collecting spectral data $N_1$ of the first white board through the spectral probe;

step 2: rotating the shaft to enable the second white board to face the spectral probe, and collecting spectral data $N_2$ of the second white board through the spectral probe;

step 3: rotating the shaft to enable the first white board and the second white board to diverge from the spectral probe, collecting spectral data $N_3$ of the object at the seabottom through the spectral probe, and collecting the distance data between the spectral probe and the object at the seabottom through the distance meter;

step 4: calculating the reflectivity $R_3$ of the object at the seabottom through the following equation group:

$$\begin{cases} R_3 = \dfrac{N_3 R_1}{N_1} \cdot e^{2k(L_2+L_3)} \\ k = \dfrac{\ln \dfrac{N_1 R_2}{N_2 R_1}}{2L_2} \end{cases} ; \quad (1)$$

wherein, $R_1$ represents a reflectivity of the first white board, $R_2$ represents a reflectivity of the second white board, $L_2$ represents a distance between the first white board and the second white board, $L_3$ represents a distance between the second white board and the object at the seabottom, and k represents an attenuation coefficient of light in seawater.

7. The device according to claim 2, wherein the first white board and the second white board are rotatably connected to the shaft through spherical plain bearings.

8. The device according to claim 3, wherein the first white board and the second white board are rotatably connected to the shaft through spherical plain bearings.

* * * * *